United States Patent [19]
Parker et al.

[11] Patent Number: 5,428,439
[45] Date of Patent: Jun. 27, 1995

[54] RANGE MEASUREMENT SYSTEM

[75] Inventors: Donald L. Parker, Bryan; Tian M. P. Roan, College Station, both of Tex.

[73] Assignee: The Texas A&M University System, College Station, Tex.

[21] Appl. No.: 157,873

[22] Filed: Nov. 24, 1993

Related U.S. Application Data

[63] Continuation of Ser. No. 950,639, Sep. 23, 1992, abandoned.

[51] Int. Cl.[6] .................. G01C 3/08; G01P 3/36; B60T 7/16
[52] U.S. Cl. .................. 356/5.01; 356/28; 180/169
[58] Field of Search .................. 356/5, 28; 180/169

[56] References Cited

U.S. PATENT DOCUMENTS

| | | | |
|---|---|---|---|
| 3,604,805 | 9/1971 | Scott | 356/28 |
| 3,619,058 | 11/1971 | Hewlett | 356/5 |
| 3,649,123 | 3/1972 | Ulicki | 356/5 |
| 3,661,459 | 5/1972 | Aoki | 356/5 |
| 3,740,141 | 6/1973 | DeWitt, Jr. . | |
| 3,752,582 | 8/1973 | Troll et al. | 356/5 |
| 3,753,126 | 8/1973 | Hines et al. . | |
| 3,778,159 | 12/1973 | Hines et al. . | |
| 3,813,165 | 5/1974 | Hines et al. . | |
| 3,898,007 | 8/1975 | Wiklund | 356/5 |
| 4,003,049 | 1/1977 | Sterzer et al. . | |
| 4,249,176 | 2/1981 | Oishi et al. . | |
| 4,257,703 | 3/1981 | Goodrich | 356/28 |
| 4,527,894 | 7/1985 | Goede et al. | 356/28 |
| 4,552,456 | 11/1985 | Endo | 356/5 |
| 4,632,543 | 12/1986 | Endo | 356/5 |
| 4,823,169 | 4/1989 | Ogura . | |
| 4,925,335 | 5/1990 | Eigenmann . | |
| 4,926,170 | 5/1990 | Beggs et al. . | |
| 4,926,171 | 5/1990 | Kelley . | |
| 4,934,477 | 6/1990 | Dai . | |
| 4,934,779 | 6/1990 | Dunning . | |
| 4,957,362 | 9/1990 | Peterson | 356/5 |
| 4,965,583 | 10/1990 | Broxmeyer . | |
| 5,125,736 | 6/1992 | Vaninetti et al. | 356/5 |

*Primary Examiner*—Stephen C. Buczinski
*Attorney, Agent, or Firm*—Baker & Botts

[57] ABSTRACT

A vehicle control system (12) is provided which comprises a range measurement system (14) which transmits a signal (20) to a target (22) and receives an echo signal (24) returned from the target (22). The range measurement system (14) comprises a transmitter system (26) and a receiver system (28). The receiver system (28) generates an analog signal representative of the range. The target (22) transmits the range signal to a processor (30). Processor (30) may be used to provide warning signals and to control a conventional speed control system (16) coupled to the throttle (18) of a vehicle (10).

5 Claims, 7 Drawing Sheets

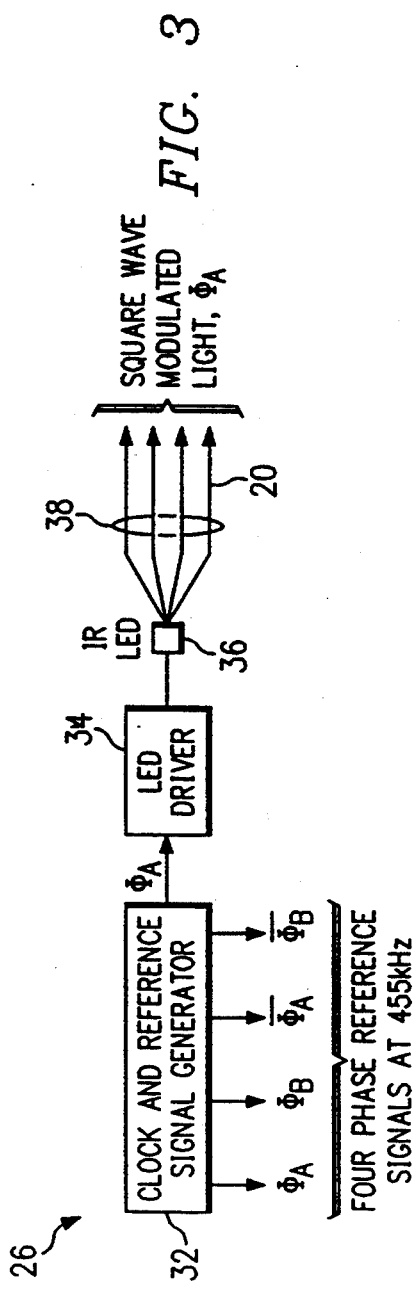
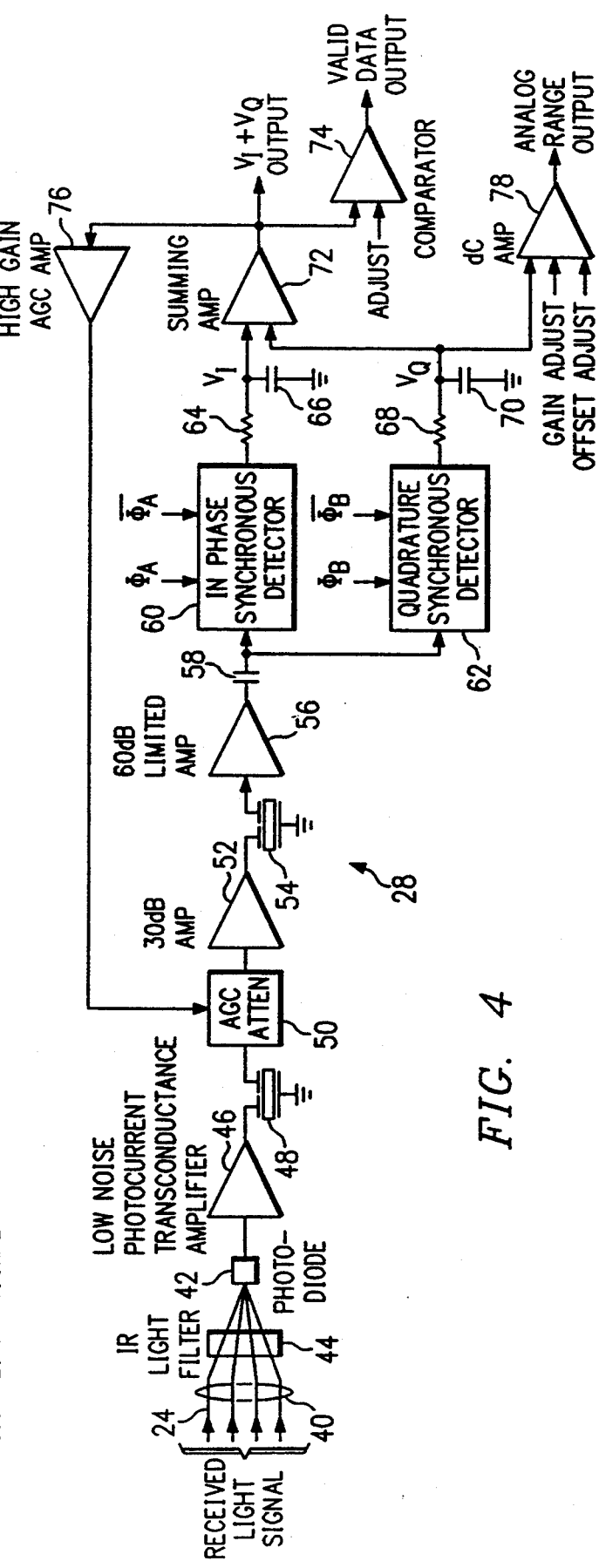

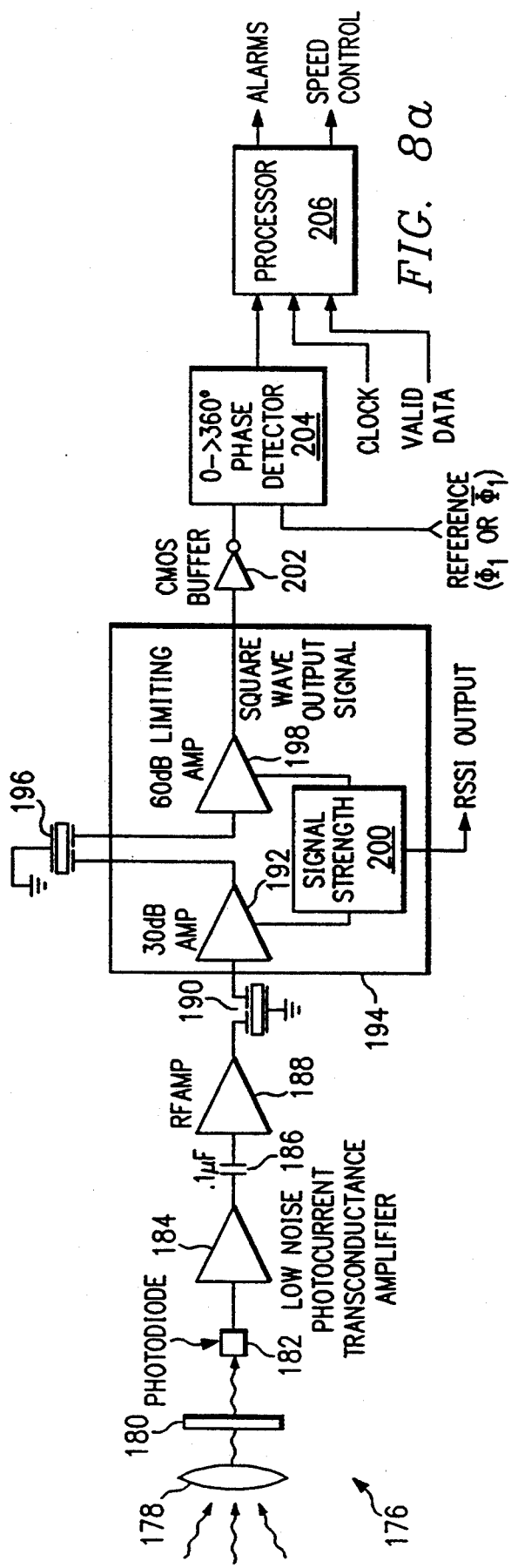
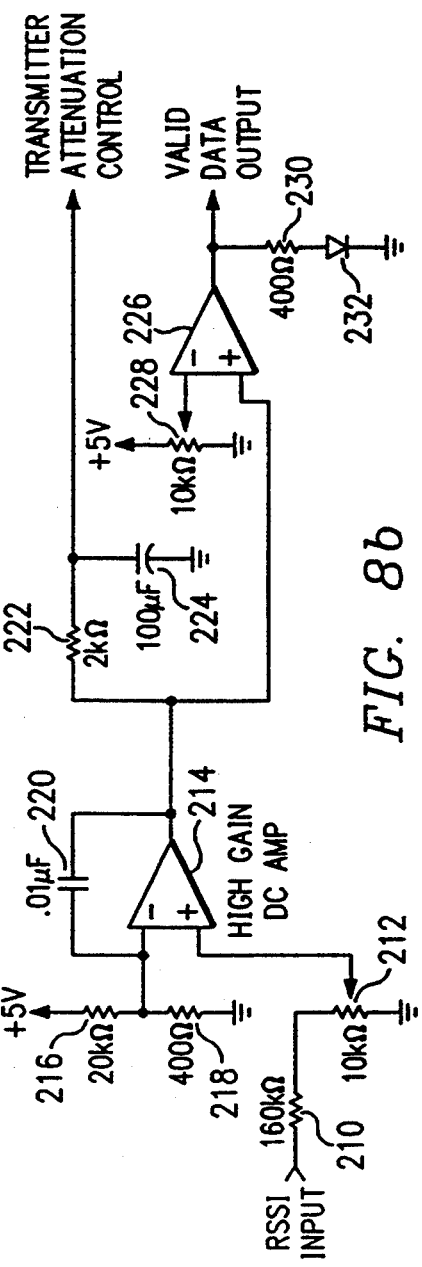
FIG. 8a
FIG. 8b

RANGE MEASUREMENT SYSTEM

CROSS REFERENCE TO RELATED APPLICATIONS

This application is a continuation of application Ser. No. 07/950,639 filed Sep. 23, 1992, entitled "Range Measurement System" by Donald L. Parker and Tian M. P. Roan, now abandoned.

TECHNICAL FIELD OF THE INVENTION

This invention relates in general to the field of electronic and optical systems and more particularly to an electro-optical range measurement system.

BACKGROUND OF THE INVENTION

Range measurement systems have been used in a variety of applications, including speed measurement for vehicles for law enforcement purposes. In addition, speed control systems have been incorporated into automobiles for years to allow a driver to set the speed he wishes to travel. However, under many circumstances, constant speed is not a safe manner of travel. Safe drivers do not drive at a constant speed but rather keep a parameter referred to as "time to collision" relatively constant. In this manner, at lower speeds automobiles can travel closer together whereas at higher speeds more distance is required between automobiles to allow for safe stopping distance.

In order to apply active ranging systems to an automated driving system, a highly accurate but low cost ranging system must be combined with systems capable of controlling speed to allow for relative consistency in the time to collision parameter during operation of the vehicle. Accordingly, a need has arisen for systems and methods which combine ranging operations using simple low cost ranging systems with digital processing capability to allow for automatic control of the speed of vehicle incorporating the ranging system.

SUMMARY OF THE INVENTION

In accordance with the teachings of the present invention, a range measurement system and method are described which substantially reduces or eliminates disadvantages associated with prior systems and methods. More particularly, a range measurement system for use with an automobile is provided that comprises a transmitter system attached to the automobile and operable to transmit a transmitted signal in the direction the automobile is travelling. A receiver system attached to the automobile is operable to receive a reflected signal comprising a reflection of the transmitted signal reflected from a target. A processor system coupled to the receiver is operable to determine the range between the automobile and the target using the reflected signal.

BRIEF DESCRIPTION OF THE DRAWINGS

A more complete understanding of the advantages of the present invention may be acquired by referring to the accompanying drawings in which like reference numbers indicate like features and wherein:

FIG. 3 is a schematic illustration of one embodiment of the transmitter circuitry associated with the range measurement system of the present invention;

FIG. 4 is a schematic diagram of one embodiment of the receiver circuitry associated with the range measurement system of the present invention;

FIGS. 8a and 8b are schematic diagrams of a receiver system and attenuation control system, respectively, that may be used in one embodiment of the range measurement system of the present invention;

DETAILED DESCRIPTION OF THE INVENTION

Figure 1:
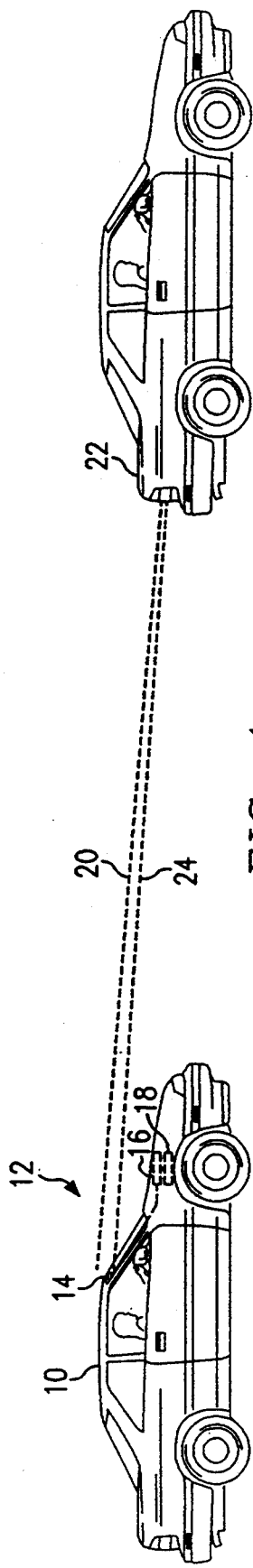
FIG. 1 is an illustration of the operation of the range measurement system of the present invention.

Referring to FIG. 1, a vehicle 10 is illustrated that includes a vehicle control system indicated generally at 12 constructed according to the teachings of the present invention. Vehicle control system 12 comprises a range measurement system 14 which is coupled to a speed control system 16. Speed control system 16 is coupled according to known methods to a throttle 18 controlling the engine and accordingly the ground speed of the vehicle 10.

In operation, the range measurement system transmits a signal indicated by a line 20 which is reflected by a target 22. The target 22 generates a reflected signal indicated by a line 24 which is received by the range measurement system 14. Processing circuitry within range measurement 14 can calculate the ratio of the distance between vehicle 10 and target 22 to the relative velocity between vehicle 10 and target 22. This ratio is the time to collision of vehicle 10 to target 22. Range measurement system 14 can then output the necessary signals to the speed control system 16 to control the time to collision value such as, for example, to keep such value at some predetermined constant value.

Figure 2:
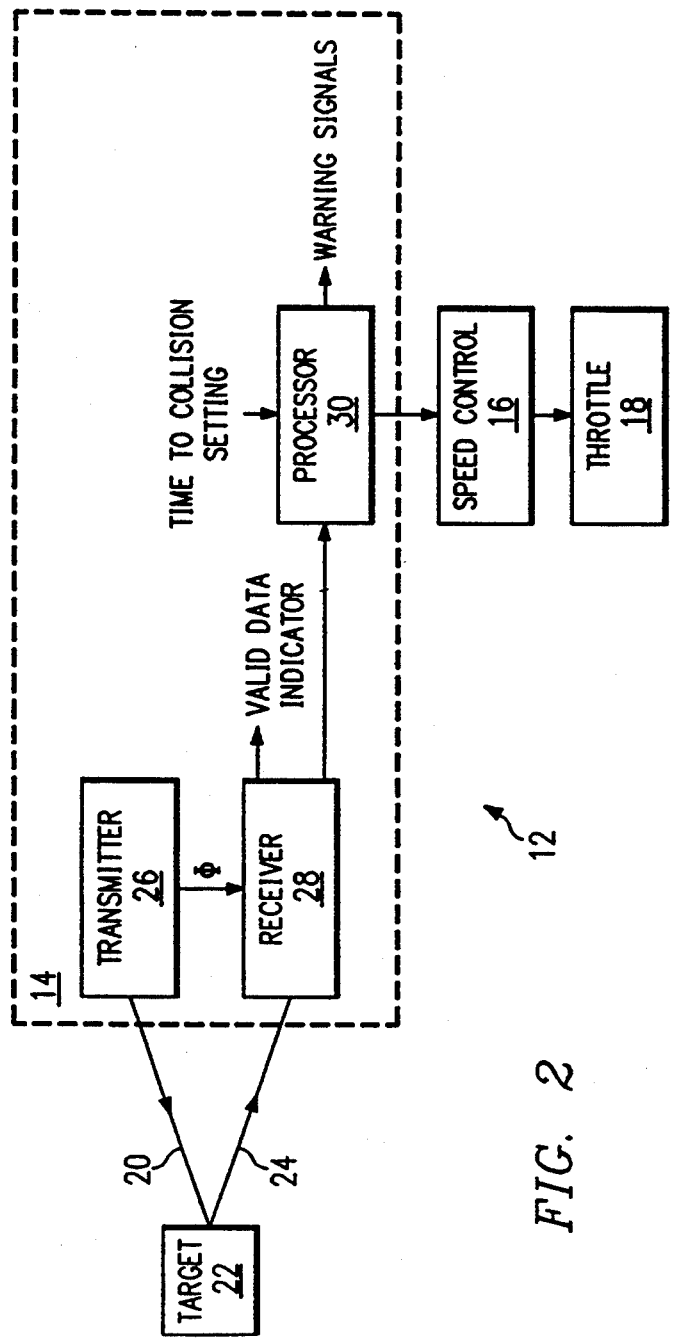
FIG. 2 is a schematic block diagram of the vehicle control system of the present invention.

Referring now to FIG. 2, a detailed description of one embodiment of vehicle control system 12 is illustrated. In FIG. 2, range measurement system 14 is shown to comprise a transmitter system 26 which generates the transmitted optical signal indicated by line 20 which strikes the target 22 generating the reflected signal indicated by line 24. The reflected signal 24 is received by a receiver system 28 of range measurement system 14. According to one embodiment of the present invention, receiver system 28 receives phase data from the transmitter 26 to enable receiver system 28 to perform phase sensitive detection of the received signal 24. The receiver system 28 supplies an analog or digital range output to a processor system 30. Processor system 30 converts any analog range output to a digital signal representative of the distance between the vehicle 10 and the target 22 and generates the signals required to control the speed control system 16 in order to maintain and control the time to collision value. This value may be supplied by a user of the system by inputting a time to collision setting into processor 30.

In addition, processor 30 may be programmed to supply certain warning signals if the actual time to collision value falls below one or more threshold values. These warning signals could be used to disengage the automatic speed control system 16. Further, visible, audible, or other methods of warning the driver of the vehicle 10 could be actuated by the warning signals generated by processor 30. In order that the automatic vehicle control system of the present invention may be incorporated into the driving habits less obtrusively, alternative warning systems may be preferable. For example, the warning signals generated by processor 30 may be used to actuate a vibrator placed in the steering wheel of vehicle 10. In this manner, when a target 22 became too close to the vehicle 10, a non-obtrusive and non-startling indication could be given to the driver of vehicle 10 who could then incorporate such an indication into the many perceptions used by modern drivers in operating their vehicles.

The vibrator in the steering wheel may be constructed using an eccentric electric motor placed in the steering column or steering wheel controlled by the digital signal generated by the processor 30. A variety of other indicators to the driver of the vehicle could be used. It should be understood that the warning systems described herein are presented solely for the purposes of teaching technical advantages of the present invention and should not be construed to limit the teachings of the present invention to these or any embodiments.

FIG. 3 is a schematic diagram showing one possible embodiment of transmitter system 26 constructed according to the teachings of the present invention. Transmitter system 26 comprises a clock and reference signal generator 32 which generates a square wave signal $\phi_A$ at a frequency of 455 kHz. The $\phi_A$ signal is transmitted to an LED driver 34 which drives an infrared LED 36. Infrared LED 36 emits a square wave modulated infrared light signal that is passed through a lens 38 and transmitted into the path of the vehicle 10. The clock and reference signal generator 32 also generates four phase reference signals at 455 kHz. The first of these signals is essentially a copy of the $\phi_A$ signal. A second signal, $\phi_B$, is generated to be 90° out of phase with the $\phi_A$ signal. A third signal $\overline{\phi_A}$ is 180° out of phase with the $\phi_A$ signal. A fourth signal $\overline{\phi_B}$ is 270° out of phase with $\phi_A$ or 180° out of phase with $\phi_B$.

FIG. 4 is a detailed schematic illustration of one possible embodiment of receiver system 28 constructed according to the teachings of the present invention. The received light signal 24 is focused by a lens 40 onto a photo diode 42 after being passed through an infrared light filter 44. Receiving lens 40 may comprise, for example, an inexpensive Fernel lens. The signal from photo diode 42 is transmitted to an amplifier 46 which may comprise, for example, a low-noise, photo-current, transconductance amplifier which is operable to generate a combination of the received square wave echo and noise signals. The signal amplitude generated by amplifier 46 may be on the order of 100 mV per $\mu$W of light signal received by photo diode 42.

The signal from amplifier 46 is passed through a filter 48 which may comprise a 455 kHz ceramic filter coupled as shown in FIG. 4. The filtered signal from filter 48 comprises a sine wave signal associated with the received echo from the target and background noise signals which are both present within the 455 kHz filter bandwidth. This combined signal is passed through an automatic gain control (AGC) attenuator 50 which is used as a portion of a feedback loop to keep the output voltage of the receiver system 28 constant regardless of the amount of echo signal received from the target 22. The attenuated signal is transmitted from AGC attenuator 50 to an amplifier 52 which may provide on the order of 30 dB of amplification. The amplified signal is then transmitted from amplifier 52 through a second filter 54 which may also comprise a 455 kHz ceramic filter. The filtered signal is then passed through a second amplifier 56. Amplifier 56 may comprise, for example, a 60 dB limiter amplifier which generates a limited square wave signal with a noise component resulting from phase jitter in the transmitter and receiver system. This limited square wave signal with the noise component is passed through a capacitor 58 which may comprise on the order of a 0.1 $\mu$F ceramic disk capacitor. Capacitor 58 serves to block DC components of the limited square wave signal. The limited square wave signal is taken from capacitor 58 in parallel into two phase detector circuits 60 and 62. Phase detector 60 is also coupled to the $\phi_A$ and $\overline{\phi_A}$ signals transmitted from the clock and reference signal generator 32 of transmitter system 26. Similarly, phase detector 62 provides quadrature synchronous phase detection of the signal transmitted from capacitor 58. Phase detector 62 is coupled to the $\phi_B$ and $\overline{\phi_B}$ signals transmitted from the clock and reference signal generator 32 of transmitter 26.

Phase detection circuits 60 and 62 produce square wave signals having wave forms whose duty cycles are proportional to the phase shift detected by the circuits 60 and 62. This phase shift value is converted to an analog-in-phase voltage, $V_I$, by passing the waveforms generated from phase detection circuit 60 through a resistor 64 and a capacitor 66 coupled as shown in FIG. 4.

Similarly, the waveform output by phase detector 62 is passed through a resistor 68 and a capacitor 70 to generate a quadrature voltage $V_Q$ at the node between resistor 68 and capacitor 70. In-phase voltage $V_I$ and quadrature voltage $V_Q$ are proportional to the RMS voltages of the waveforms transmitted by the phase detector 60 and the phase detector 62, respectively.

The analog voltages $V_I$ and $V_Q$ are input into a summing amplifier 72 which transmits a voltage proportional to the sum of $V_I$ and $V_Q$. This summed voltage is transmitted to a comparator 74 which compares the summed voltage to a set adjustable reference value and, as a result of such comparison, outputs a valid data indicator signal. This valid data indicator signal may be used to indicate to an operator of the system that a target 22 is being tracked and, more particularly, that a sufficient echo signal is being received from a target 22. The summed signal is also transmitted from summing amplifier 72 to an amplifier 76 which may comprise a high gain AGC amplifier. The amplifier 76 amplifies the summed signal and outputs a signal that controls the AGC attenuator 50. In this manner, the summed signal is used to provide feedback to AGC attenuator so that the magnitude of the summed signal output by summing amplifier 72 will remain constant regardless of the amplitude of the received light signal 24.

The quadrature voltage $V_Q$ is also output to a DC amplifier 78. DC amplifier 78 may also comprise gain adjustment inputs or offset adjustment inputs to provide calibration. DC amplifier 78 outputs a DC voltage proportional to the range between the vehicle 10 and the target 22. This analog voltage is then transmitted to the processor 30 which, as discussed previously, converts the signal to a digital value representing the range using a conventional analog to digital converter. The summed output voltage $V_I$ and $V_Q$ may be used as the reference for a standard analog to digital converter resident within processor 30 used to generate the digital measure of the range. In this manner, error inducing factors such as temperature and other environmental variations may be compensated.

Once the voltage signal from DC amplifier 78 is converted to a digital value representative of the range, conventional data processing techniques can be used to calculate a relative velocity of the vehicle 10 to the target 22. This may be accomplished by periodic measurements of the range over time. Further, using conventional data processing techniques, the range value may be divided by the relative velocity to generate the time to collision value. This value can be compared to a programmable value supplied by the user of the system or set to a suitable safe number. The result of the comparison of the time to collision to the programmable value of the time to collision can be output as a control signal of the speed control system 16. In this manner, the speed of the vehicle 10 will change in order to maintain a constant time to collision to a particular target 22. The time to collision value can also be compared in processor system 30 to other programmable values to trigger one or more warning signals. These warning signals can be used to automatically disengage the speed control system 16. Further, as discussed previously, the results of the comparison of the value of the time of the collision to the various programmable warning levels can be used to activate one or more warning signals as various threshold values are passed. Processor 30 may comprise any number of conventional microprocessor control systems used in the automobile industry.

Figure 5:
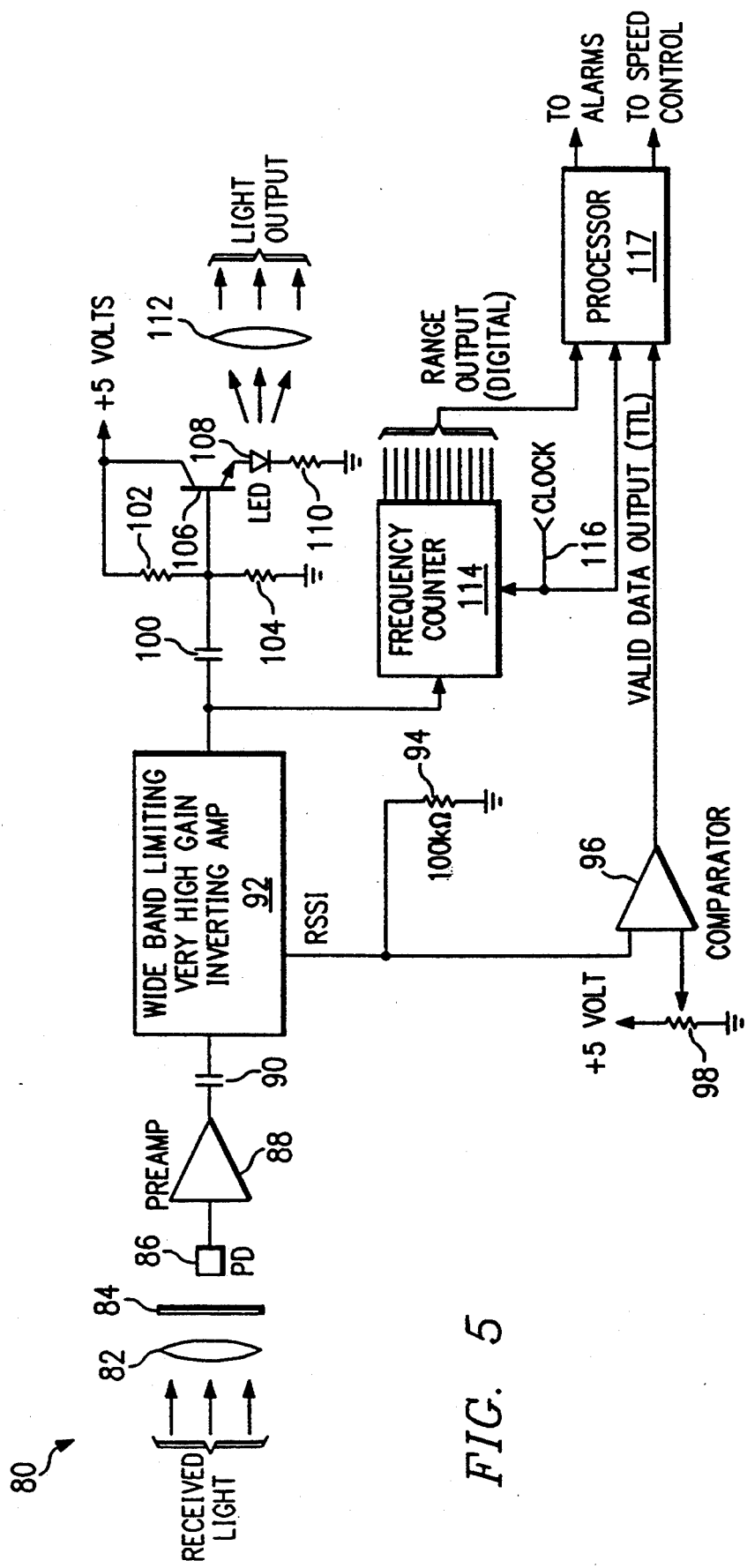
FIG. 5 is a schematic diagram of one embodiment of the range measurement system of the present invention.

FIG. 5 illustrates an alternate embodiment of the range measurement system of the present invention that utilizes an optical feedback oscillation methodology. FIG. 5 illustrates a receiver and transmitter circuit 80 which comprises a lens 82 which receives light reflected from a target. The lens 82 receives the light and passes it through an optical filter 84 to a photodiode 86. The photodiode 86 converts the optical signal to an electrical signal and transmits the electrical signal to a preamplifier 88. The preamplifier 88 has a predetermined transfer characteristic which will be described with reference to FIG. 6 herein. The preamplifier 88 transmits a signal through a capacitor 90 to an inverting amplifier 92. Inverting amplifier 92 is a very high gain wide band limiting inverting amplifier. Amplifier 92 transmits an RSSI signal through a 100 kiloohm resistor 94 to ground. The voltage created by resistor 94 is input into one input of a comparator 96. The remaining input of the comparator 96 is coupled to a potentiometer 98 which is coupled between a positive 5 volt source voltage and ground. The output of the comparator comprises a valid data output indicating a valid target has been acquired by the receiver 80. Inverting amplifier 92 outputs a signal which is substantially a square wave.

This square wave signal is transmitted through a capacitor 100 to a voltage divider comprising a first resistor 102 and a second resistor 104 coupled between the positive 5 volt supply voltage and ground. The output of inverting amplifier 92 is also coupled through capacitor 100 to the base of an NPN bipolar transistor 106 that has its collector coupled to the positive 5 volt supply voltage. The emitter of transistor 106 is coupled to an LED 108 which is coupled to ground through a resistor 110. LED 108 emits light which is passed through a lens 112 and transmitted to be reflected from targets, as described previously, and received by lens 82. The output of inverting amplifier 92 is also input into a frequency counter 114 which utilizes a clock signal 116 generated using conventional methods. Frequency counter 114 determines the frequency of the output of inverting amplifier 92 from which it gleans the data necessary to determine the range to the acquired target. This range is output in digital form from frequency counter 114 to processor 117 which processes the frequency data received and generates the speed control and warning signals as described previously.

Figure 6:
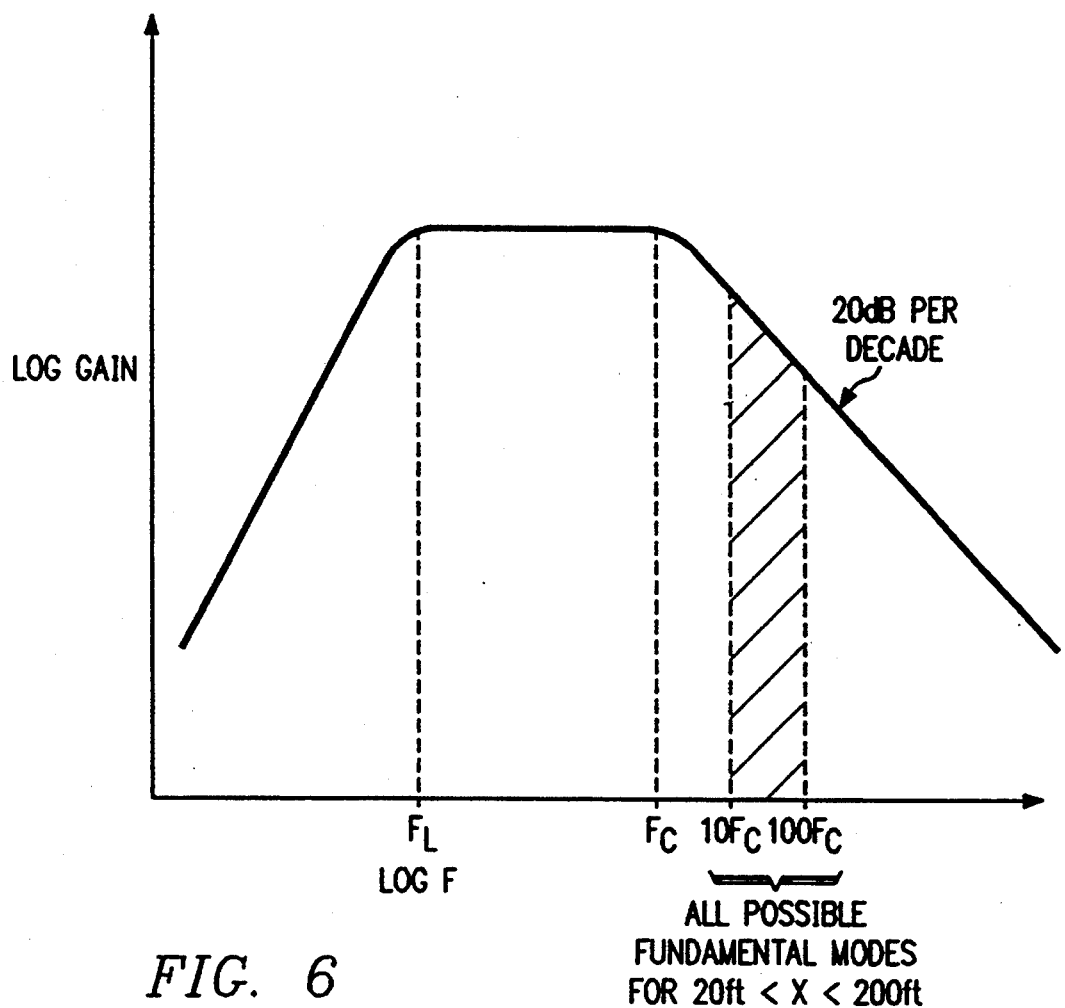
FIG. 6 is a graphical representation of a transfer characteristic of a portion of one embodiment of the range measurement system of the present invention.

FIG. 6 is a graphical illustration of the transfer characteristics of photo-diode 86 and preamplifier 88. Photo-diode 86 and preamplifier 88 may be designed using conventional methods and systems in such a manner as to provide low frequency and high frequency rolloff to prevent aliasing in the range output. Aliasing results from the fact that particular oscillation frequencies calculated by frequency counter 114 can correspond to more than one range to target distances. As shown in FIG. 6, according to the teachings of the present invention, the transfer characteristic of photodiode 86 and preamplifier 88 over the fundamental oscillation modes corresponding from approximately 20 feet to 200 feet comprises on the order of a 20 dB per decade frequency rolloff. This sloping transfer characteristic also helps to compensate for the variability in the amplitude of the received light signal due to the distance from target as will be discussed more fully herein.

In designing an optical range measurement system for automatic cruise control and a collision alarm, the practical vehicle-to-vehicle ranges of interest are within approximately 20 feet to 200 feet. If the transmitter/receiver system is inverting, i.e., the system operates with 180° phase shift from light input to light output, the system may oscillate at any frequency within the bandwidth where the light transit time causes any of the following additional phase shifts: 180°, 540°, 900°, etc., where $$\text{light transit time} = \frac{2x}{c}$$

where
x = vehicle-to-vehicle distance and
c = speed of light.

The frequencies shown in the following table are the fundamental frequencies, $F_o$, corresponding to the target distance for a system using an inverting transmitter/receiver system, i.e. a system using 180° of phase shift.

| Target Distance | Oscillation Frequency |
|---|---|
| 200 ft. | 1.25 MHz |

-continued

| Target Distance | Oscillation Frequency |
|---|---|
| 20 ft. | 12.5 MHz |

The system 80 may also oscillate at $3F_o$ (540°), $5F_o$(900°), etc., if these frequencies are allowed to remain in the operational bandwidth. For example, if the target is at 200 feet, the system may oscillate at 1.25 MHz, 3.74 MHz, 6.25 MHz, etc.

Spontaneous oscillations in unstable positive feedback systems are always started by random noise. In systems with multiple oscillation modes, one mode will dominate as determined by the gain/loss mechanism for each mode and by the chance random noise. If the gain in one mode is substantially higher than all other possible modes, then the chance of oscillations in any of the other modes rapidly vanishes. If the frequency response of the receiver system 80 were truly flat over the bandwidth of interest, then all possible modes within the bandwidth would be equally likely since the optical losses are independent of frequency. For this reason, the photo-diode 86 and components in the preamplifier 88 may be chosen to give an overall frequency response and transfer characteristic as shown in FIG. 6. The low frequency cutoff $F_L$ serves to block DC and low frequency optical noise in the scene as well as 1/F noise in the photo-diode 86 and preamplifier 88. The upper pole frequency, $F_c$, serves two purposes: (1) it rolls the gain off over the frequency range of interest and (2) it causes 90° phase shift over the frequency range of interest.

Referring again to FIG. 5, in operation, the wide band inverting amplifier 92 has flat frequency response over the range of interest. Amplifier 92 may be a single integrated circuit or a series of integrated circuit amplifiers as commonly used in RF communications equipment. The RSSI output of amplifier 92 is an output current which when passed through the resistor 94 produces a DC voltage proportional to the logarithm of the RMS signal strength. This DC voltage is used by the comparator 96 to instruct the processor 117 that the system 80 has acquired a target.

Processor 117 is supplied to receive the validated output from comparator 96 and the digital range data from frequency 114. The processor 117 utilizes the clock signal 116 to periodically recalculate the range of targets and to provide control signals to suitable alarms and speed control systems as described previously.

Another useful property of the wide band amplifier 92 is that the output will be a limited square wave for a very small amplitude input sinewave and the phase of the output will not change with amplitude of the input over several decades of magnitude. This is an important technical advantage of the embodiment described in FIGS. 5 and 6 since the amount of returned light will be a highly variable quantity. In normal operation with an acquired target, the transmitted light will be square wave modulated at a frequency in the range of interest.

The preamplifier 88 causes ~90° phase shift for all frequencies in the range of interest and the wide band amplifier 92 causes another 180° through inversion. This means the fundamental mode of optical feedback oscillation will occur when the propagation delay causes the remaining 90° phase shift. However, the next possible higher frequency mode will occur for 90°+360°, or 450° of phase shift due to propagation delay. Due to the extra 90° of phase shift in the transmitter/receiver, the higher modes follow the sequence $F_o$, $5F_o$, $9F_o$. Since the gain of the transmitter/receiver rolls off at higher frequencies and since the higher modes are so dispersed, random noise cannot cause spontaneous oscillations in the higher modes.

The added 90° phase shift results in the following range frequency table:

| RANGE FREQUENCY TABLE | | |
|---|---|---|
| Target Distance | Propagation Delay | $F_o$ (at 90° Phase Shift) |
| 20 feet | 40 ns | 6.25 MHz |
| 100 feet | 200 ns | 1.25 MHz |
| 200 feet | 400 ns | 625 kHz |

The system 80 transmits and receives square wave modulated light at frequency $F_o$ when the system 80 has acquired a target. A square wave is the odd harmonic sum of sinusoids:

$$\text{Sin } w_o t + \frac{1}{3} \text{Sin } 3W_o t + \frac{1}{5} \text{Sin } 5W_o t + \text{etc.}$$

All these sinusoids have the same zero crossings. Since all frequencies of interest are shifted ~90° by the frequency rolloff of preamplifier 88 and since the gain of the preamplifier 88 is proportional to 1/F for the frequencies of interest, the output of preamplifier 88 will also be a sum of sinusoids except the output will be delayed and the harmonics will be attenuated relative to the fundamental frequency. The output of preamplifier 88 will therefore be given as:

$$\text{Sin } W_o t + \frac{1}{9} \text{Sin } 3W_o t + \frac{1}{25} \text{Sin } 5W_o t \text{ etc.}$$

The zero crossings of the harmonics are still, for practical purposes, the same as the fundamental frequency since all are shifted ~90°. Thus, the output of preamplifier 88 is a slightly distorted sine wave at the fundamental frequency.

Although the gain of preamplifier 88 drops 20 dB over the frequency range of interest, it should be noted that the target is only 20 feet away at the highest frequency. The gain decrease actually helps compensate for the rapid loss in optical feedback with target distance.

One may also be concerned that noise in the high gain flat band portion of the transfer characteristic of preamplifier 88 may prevent optical feedback oscillations. According to other embodiments of the present invention, the $F_L$ and $F_C$ pole frequencies may be moved much closer together even to the point of making a high Q bandpass filter. In such a case, the lowest frequency of interest, 625 kHz, may be only slightly higher than the center bandpass frequency and still assure ~90° phase lag.

As an example, suppose the High Q bandpass frequency is 500 kHz. Recall there is no phase shift at the center frequency. The target distance which causes 500 kHz oscillation for 180° phase delay is given as:

$$x = \frac{C}{4F_o} = 500 \text{ ft. at } 500 \text{ kHz}$$

If the range processor 117 is programmed to interpret frequencies as reciprocal distance it will think the very highly reflecting target at 500 feet is at $$\frac{625}{500} \times 200 = 250 \text{ feet}$$

The sole effect of this inconsistency is the apparent compression of distances between 200 and 500 feet. This compression is not critical to the operation of the system. Changes in distance appear much slower at these distances so as to help prevent false collision alarms. A similar analysis on the low frequency side of the bandpass center (where the phase begins to lead up to 90°) indicates an even greater apparent compression.

In the descriptions presented above, it is presumed that the transmitter/receiver transfer characteristics were such that the electronic phase shift was a constant 270° over the entire range of frequencies of interest. This is not required for practical operation of this embodiment of the optical range measurement system. Indeed, the only practical advantage of having a constant electronic phase shift over the range of frequencies of interest in that the spontaneous oscillation frequency is inversely proportional to the target distance. Any transfer characteristic which sufficiently disperses and suppresses higher mode oscillations may be used. The only requirement is that there be a unique one-to-one correspondence between target distance and spontaneous oscillation frequency. In general, a conventional "look-up" table may be used to convert any frequency to the corresponding correct target distance if such a one-to-one correspondence is present.

Figure 7:
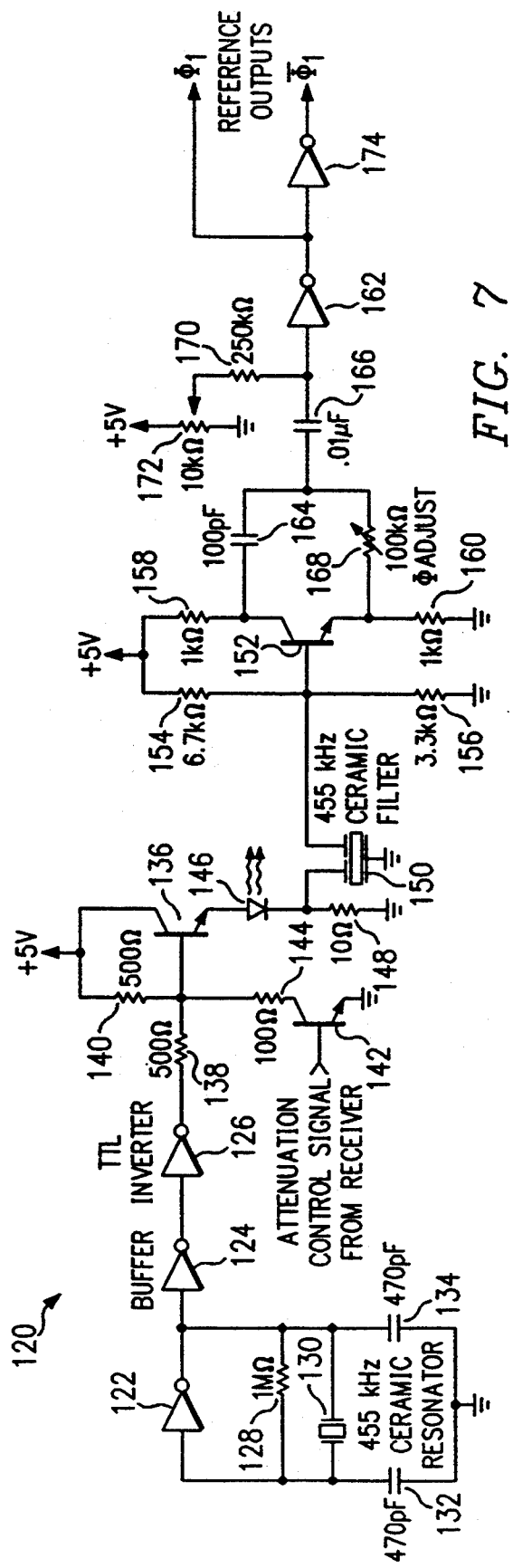
FIG. 7 is a schematic diagram of one embodiment of a transmitter and reference signal generator system that may be used in one embodiment of the range measurement system of the present invention.

FIGS. 7, 8a and 8b describe an alternate embodiment of the range measurement system of the present invention which utilizes an optical feedback oscillator methodology utilizing 450 kHz ceramic resonators.

FIG. 7 illustrates a schematic diagram of a circuit 120 which comprises an oscillator system, LED driver system, and a square wave reference generator system. Circuit 120 comprises three CMOS inverters 122, 124 and 126 coupled in series. A 1 MΩ resistor 128 is coupled across the inputs and outputs of inverter 122. Similarly, a 455 kHz ceramic resonator 130 is coupled between the input and output of CMOS inverter 122. The inputs and outputs of CMOS inverter 122 are coupled in parallel to ground through a pair of 470 pF capacitors 132 and 134 as shown in FIG. 7. The output of inverter 122 is coupled to the input of inverter 124. The output of inverter 124 is coupled to the input of inverter 126. The output of inverter 126 is coupled to the base of a bipolar NPN transistor 136 through a 500Ω resistor 138. Transistor 136 may comprise a bipolar transistor part number 2N4401 manufactured by Motorola. The collector of transistor 136 is coupled to a positive 5 volt supply voltage. The base of transistor 136 is also coupled to the positive 5 volt supply voltage through a 500Ω resistor 140. The base of transistor 136 is coupled to the collector of a second bipolar transistor 142 through a 100Ω resistor 144. Second transistor 142 may be identical to transistor 136.

The base of transistor 142 is coupled to an attenuation control signal received from the receiver system which will be described with reference to FIG. 8b herein. The emitter of transistor 142 is coupled to ground potential. The emitter of transistor 136 is coupled to ground potential through the series connection of an LED 146 and a 10Ω resistor 148. LED 146 may comprise, for example, an HFE-4000-014 LED manufactured by Honeywell. LED 146 emits the light which is transmitted towards targets to generate the reflective signal which is used by the range measurement system to determine the range to the target by the present system. The node between LED 146 and resistor 148 is coupled to a first node of a 455 kHz ceramic filter 150. A second node of filter 150 is coupled to the ground potential. The third node of filter 150 generates a 455 kHz sine wave signal which is in phase with the light emitted from LED 146. This 455 kHz sine wave signal is transmitted to the base of a third transistor 152. The base of transistor 152 is coupled to the positive 5 volt supply voltage through a 6.7 kΩ resistor 154 and is coupled to ground potential through a 3.3 kΩ resistor 156. The transistor 152 comprises a NPN bipolar transistor which may be identical to transistors 136 and 142 described previously. The collector of transistor 152 is coupled to the positive 5 volt supply voltage through a 1 kΩ resistor 158. The emitter of transistor 152 is coupled to ground potential though a 1 kΩ resistor 160. The collector of transistor 152 is coupled to the input of a CMOS inverter 162 through a series connection of a 100 pF capacitor 164 and a 0.01 µF capacitor 166 as shown in FIG. 7. The emitter of transistor 152 is coupled to the input of inverter 162 through the series connection of a 100 kΩ potentiometer 168 and capacitor 166 as shown in FIG. 7. The input of inverter 162 is coupled to the positive 5 volt supply voltage and ground through a 250 kΩ resistor 170 and a 10 kΩ potentiometer 172 as shown in FIG. 7. The output of inverter 162 comprises the $\phi_1$ 455 kHz square wave reference signal. The output of inverter 162 is coupled to the input of a CMOS inverter 174. The output of inverter 174 comprises the $\overline{\phi_1}$ 455 kHz square wave reference signal which is 180° phase shifted with respect to the $\phi_1$ signal.

FIG. 8a illustrates a schematic diagram of a receiver circuit to be used in conjunction with the transmitter circuit 120 described with reference to FIG. 7 previously. FIG. 8a illustrates a receiver circuit 176 which comprises a lens 178 which receives coherent light reflected from targets. The light is focused through an infrared light filter 180 onto a photo-diode 182. The photo-diode 182 converts the focused light into an electrical signal which is transmitted to a low noise photocurrent transconductance amplifier 184. The transconductance amplifier 184 outputs a square wave signal representative of the received light and noise signals. This square wave signal is on the order of 165 millivolts per microwatt in magnitude. The square wave signal is passed through a 0.1 µF capacitor 186 to an RF amplifier 188. RF amplifier 188 may comprise, for example, a model NE602A radio frequency amplifier manufactured by Signetics Incorporated.

The output of amplifier 188 is coupled to one node of a 455 kHz ceramic filter 190 which has a second node coupled to ground potential. Ceramic filter 190 is substantially identical to ceramic filter 150 described with reference to FIG. 7 previously. The remaining node of filter 190 is coupled to the input of a 30 dB amplifier 192. Amplifier 192 may be disposed on an integrated amplifier chip 194 which may comprise, for example, a NE604A amplifier circuit manufactured by Signetics Corporation.

The output of amplifier 192 is input into one node of a 455 kHz ceramic filter 196 which is also coupled to ground potential as shown in FIG. 8a. The remaining node of ceramic filter 196 is coupled to the input of a 60 dB limiting amplifier 198. Limiting amplifier 198 may also be resident on chip 194. Amplifier chip 194 receives input from amplifier 192 and 198 and generates an RSSI output from a signal strength circuit 200 resident on chip 194. The output of limiting amplifier 198 comprises a square wave output signal which is input into a CMOS buffer inverter 202. The output of inverter 202 is input into a phase detector circuit 204. Phase detector 204 utilizes either the $\phi_1$ or $\overline{\phi}_1$ reference signals generated by circuit 120 described with reference to FIG. 7 previously. One embodiment of phase detector circuit 204 will be described with reference to FIG. 11 herein. Phase detector 204 produces an analog range output signal which is proportional to the range to the acquired target. This signal is input to a signal processor 206 which also receives a valid data signal from the attenuation circuit which will be described with reference to FIG. 8b. Processor 206 also receives a clock signal. Processor 206 analyzes the analog range signal and outputs control signals for alarm systems and speed control systems using conventional processing techniques as described previously.

FIG. 8b illustrates an attenuation control circuit 208 which is used in conjunction with transmitter circuit 120 and receiver circuit 176 discussed previously with reference to FIGS. 7 and 8a, respectively. Circuit 208 receives the RSSI output signal from circuit 194. The RSSI (received signal strength indicator) signal is a DC signal which is proportional to the logarithm of the amplitude of the received optical signal. The RSSI signal is passed through a voltage divider comprising a series connection of a 160 kΩ resistor 210 and a 10 kΩ potentiometer 212. This voltage divider is coupled between the RSSI input and ground. The remaining node of the 10 kΩ potentiometer 212 is coupled to the non-inverting input of a differential amplifier 214. Differential amplifier 214 may comprise, for example, a one-half LM358 high gain DC amplifier. The inverting input of amplifier 214 is coupled to the positive 5 volt supply voltage through a 20 kΩ resistor 216. The inverting input of amplifier 214 is coupled to ground potential through a 400Ω resistor 218. A 0.01 μF capacitor 220 couples the inverting input and the output of amplifier 214. The output of amplifier 214 is coupled to ground potential through the series connection of a 2 kΩ resistor 222 and a 100 μF capacitor 224. The node between resistor 222 and capacitor 224 transmits a transmitter attenuation control signal to the base of transistor 142 described previously with reference to FIG. 7.

The output of amplifier 214 is also coupled to the non-inverting input of a second high gain DC amplifier 226. Amplifier 226 may also comprise a one-half LM358 amplifier. The inverting input of amplifier 226 is coupled to a 10 kΩ potentiometer 228 which is coupled between the positive 5 volt supply voltage and ground as shown in FIG. 8b.

The output of amplifier 226 is coupled to ground potential through a 400Ω resistor 230 and an LED 232. The LED 232 functions as a visual indicator of the acquisition of a target by the range detection system described. The output of amplifier 226 is transmitted to the processor 206 as the valid data signal in order to electronically inform the remainder of the system that a target has been acquired.

The 10 kΩ potentiometer 212 may be used to adjust the signal level throughout the receiver circuit 176.

Figure 9:
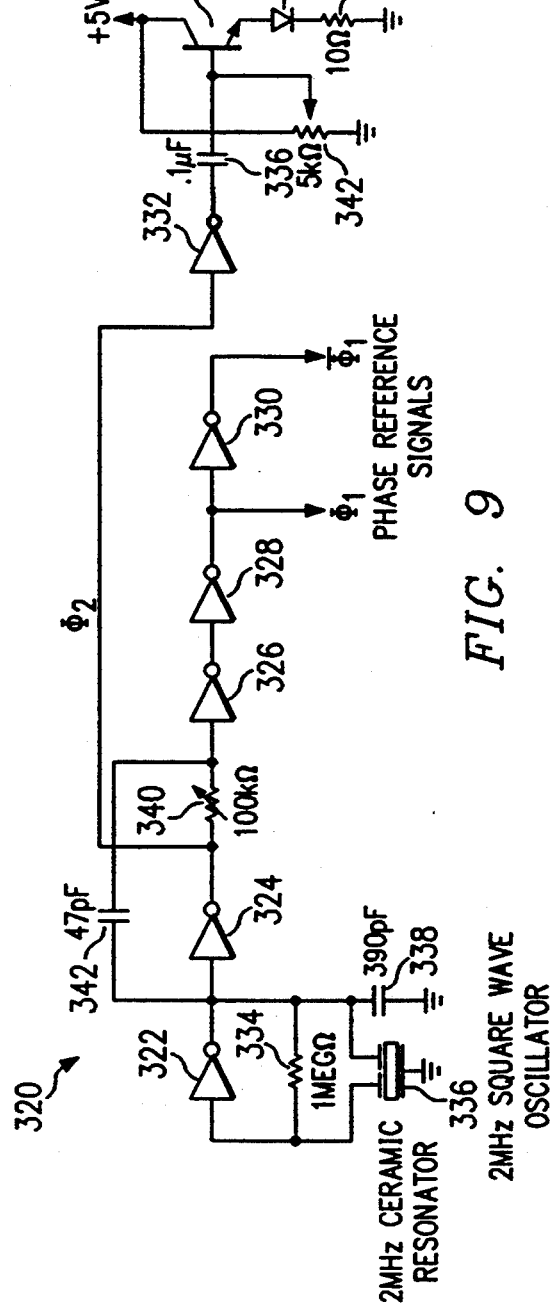
FIG. 9 is a schematic diagram of a transmitter and reference signal generator that may be used in one embodiment of the range measurement system of the present invention.
Figure 10:
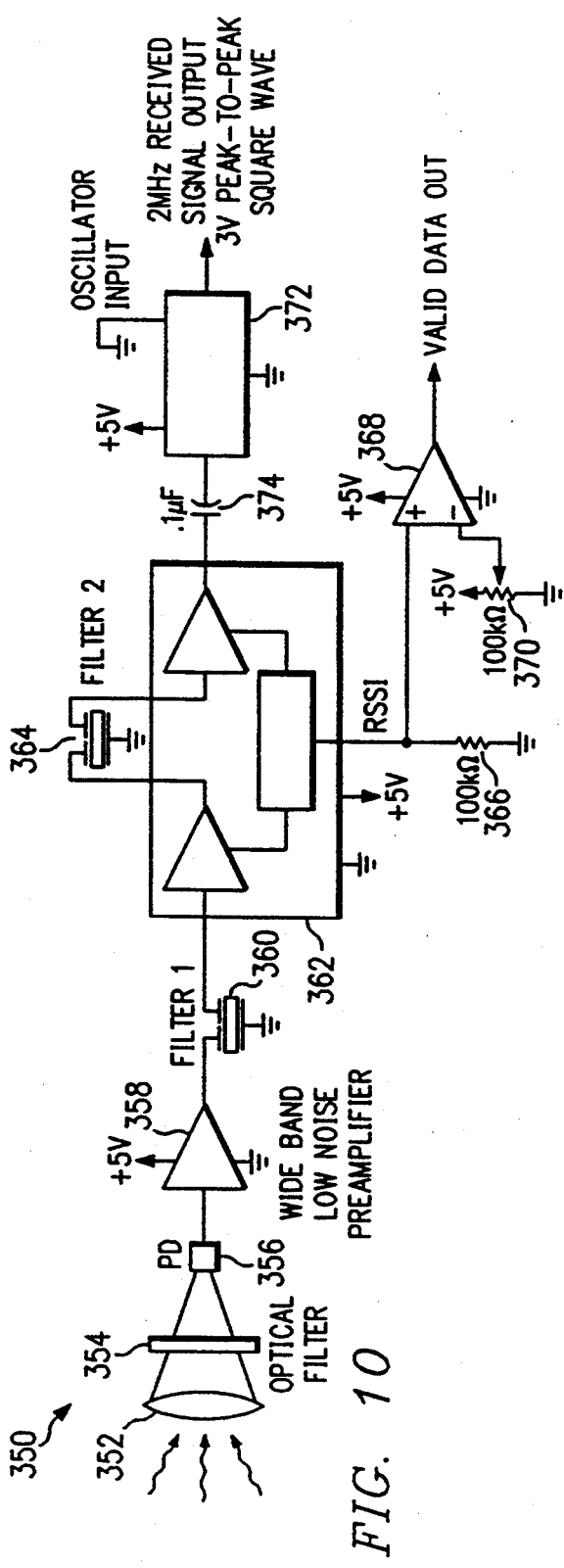
FIG. 10 is a schematic diagram of a receiver system that may be used in one embodiment of the range measurement system of the present invention.
Figure 11:
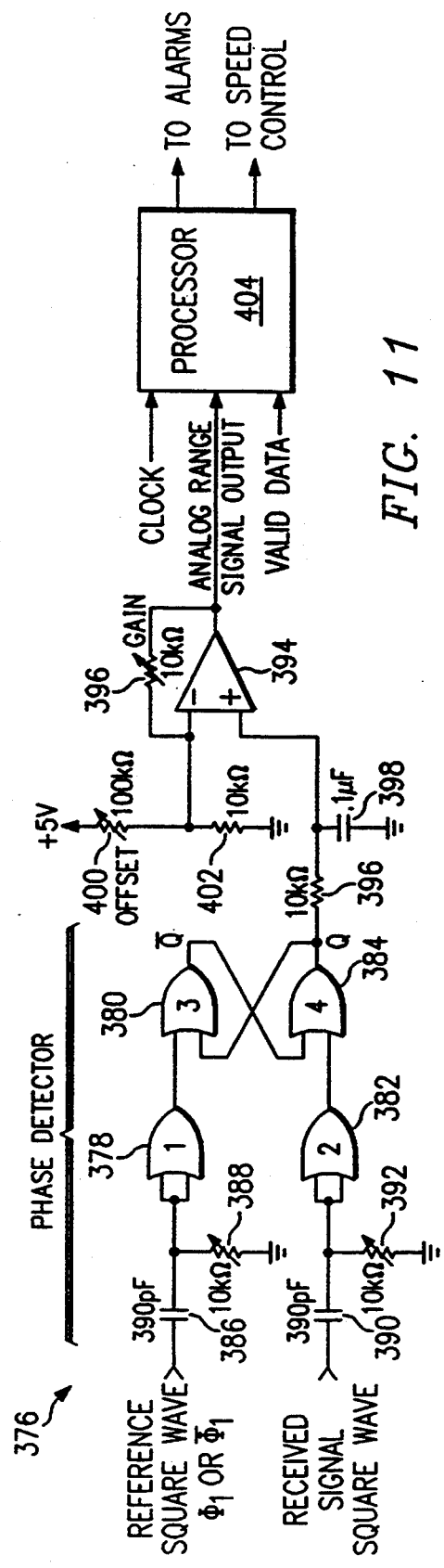
FIG. 11 is a schematic diagram of a phase detector system that may be used in one embodiment of the range measurement system of the present invention.

FIGS. 9, 10 and 11 describe an alternate embodiment of the present invention that utilizes a 2 MHz optical signal and a slightly modified optical feedback oscillation methodology.

FIG. 9 is a schematic block diagram of the transmitter and reference signal circuitry used in the 2 MHz embodiment. FIG. 9 illustrates a transmitter circuit 320 which comprises six inverters 322, 324, 326, 328, 330 and 332 coupled as shown in FIG. 9. Inverter circuits 322 through 332 may be located on a single CMOS hex inverter integrated circuit such as the MM748HC04 hex inverter chip manufactured by National Semiconductor. Inverter circuit 322 is coupled to a 1 MΩ resistor 334, a 2 MHz ceramic resonator 336 and a 390 pF capacitor 338 as shown in FIG. 9 to form a 2 MHz square wave oscillator. The output of inverter circuit 322 is coupled to the input of inverter circuit 324. The output of inverter circuit 324 is coupled to a 100 kΩ potentiometer 340. A 47 pF capacitor 342 is coupled across inverter circuit 324 and potentiometer 340 as shown in FIG. 9. The signal output by inverter circuit 324 passes through potentiometer 340 and into inverter circuit 326. The output of inverter circuit 326 passes through inverter circuit 328 and into inverter circuit 330. The output of inverter circuit 328 comprises a $\phi_1$ signal and the output of inverter circuit 330 comprises the $\overline{\phi}_1$ signal. The $\phi_1$ and $\overline{\phi}_1$ signals comprise the phase reference signals which are used in the phase measurement circuit described with reference to FIG. 11 herein. The output of inverter 324 comprises a $\phi_2$ signal which is input into inverter 332. The output of inverter 332 is coupled to the base of a NPN bipolar transistor 334 through a 0.1 μF capacitor 336. The collector of transistor 334 is coupled to the positive 5 volt supply voltage. The emitter of transistor 334 is coupled to ground through an LED 338 through the series connection of an LED 338 and a 10Ω resistor 340. The base of transistor 334 is also coupled as shown in FIG. 9 to a 5 kΩ potentiometer 342 which is coupled between positive 5 volt supply voltage and ground. LED 338 may comprise, for example, an HFE-4000-014 light emitting diode manufactured by Honeywell. LED 338 transmits the light signal toward targets to be ranged using the present system. Potentiometer 342 is used to set the peak current in the LED 338. This peak current is on the order of 200 mA with a 50 percent duty cycle for the embodiment utilizing an HFE-4000-014 light emitting diode.

Potentiometer 340 comprises a phase adjustment potentiometer that can change the phase of the $\phi_1$ square wave signal almost a full 180° with respect to the $\phi_2$ square wave signal. Either the $\phi_1$ or the $\overline{\phi}_1$ signal can be used as the reference signal in the phase detector circuit that will be described with reference to FIG. 11 herein. The potentiometer 340 may be used to compensate for random fixed phase shifts in the receiver circuit which will be described with reference to FIG. 10 herein.

FIG. 10 illustrates a 2 MHz receiver circuit 350 which comprises a lens 352 which receives optical signals reflected from a target and focuses these optical signals through an optical filter 354 onto a photo-diode 356 which converts the optical signals to an electrical signal which is transmitted to a wide band low noise preamplifier 358 which is coupled to the positive 5 volt supply voltage and ground. The output of preamplifier 358 is input to a 2 MHz ceramic resonator 360. A signal is output from filter 360 to an amplifier circuit 362 which may comprise, for example, an NE604A chip manufactured by Signetics. A second 2 MHz ceramic resonator 364 is coupled across the appropriate two inputs of amplifier chip 362. Positive 5 volt supply voltage and ground potential are also supplied to the amplifier circuit 362. The amplifier circuit 362 outputs an RSSI signal which is coupled to ground through a 100 kΩ resistor 366. The RSSI signal is also coupled to the positive input of a comparator 368. Comparator 368 may comprise, for example, an LM358 comparator circuit manufactured by National Semiconductor. The negative input of comparator 368 is coupled to a 100 kΩ potentiometer 370 which is coupled between positive 5 volt supply voltage and ground as shown in FIG. 10. Positive 5 volt supply voltage and ground are also supplied to comparator 368. Comparator 368 outputs a valid data out signal which may be used to indicate an acquired target.

The output of amplifier 362 is input into a signal processor 372 through a 0.1 μF capacitor 374. Signal processor 372 may comprise an NE602A chip manufactured by Signetics. Signal processor 372 is coupled to the positive 5 volt supply voltage and ground and has its oscillator input coupled directly to ground. Signal processor 372 outputs a 2 MHz square wave having a peak to peak voltage on the order of 3 volts corresponding to the received reflected optical signal. Photo-diode 356 and preamplifier 358 are chosen to optimize the signal to noise ratio with an overall frequency response up to 25 MHz. The small signal bandwidth of amplifier 362 is also on the order of 25 MHz. The bandwidth of the signal processor 372 is beyond 350 MHz with a very high slew rate corresponding to 2 MHz. The configuration shown in FIG. 10 minimizes amplitude dependent phase shift and eliminates the need for automatic gain control.

Filters 360 and 364 each comprise 2 MHz ceramic resonators chosen to match the characteristics of the ceramic resonator 336 described with reference to FIG. 9 previously. The matching of filters 360 and 364 assures the tracking of all these components with temperature and age. The RSSI signal comprises a current signal which is proportional to the logarithm of the RMS signal level of the received reflected signal. Potentiometer 370 is adjusted to produce a logic level high valid data output when the signal strength reaches a threshold which assures an accurate measurement.

FIG. 11 is a schematic illustration of a phase measurement circuit that may be used in conjunction with the transmitter and reference signal circuitry and receiver circuitry discussed with reference to FIGS. 9 and 10 respectively. FIG. 11 illustrates a 2 MHz 360° phase measurement circuit 376. Phase detector circuit 376 comprises 4 CMOS NOR gates 378, 380, 382 and 384 as shown in FIG. 11. Either the $\phi_1$ or $\overline{\phi}_1$ reference signal is input into both inputs of NOR gate 378 through a 390 pF capacitor 386. The inputs to NOR gate 378 are coupled to ground through a 10 kΩ potentiometer 388. The output of NOR gate 378 is coupled to one input of NOR gate 380. The remaining input into NOR gate 380 is coupled to the output of NOR gate 384. The output of NOR gate 380 is coupled to one input of NOR gate 384. The output of NOR gate 384 comprises the Q signal. The output of NOR gate 380 comprises the $\overline{Q}$ signal. The 2 MHz square wave signal output by signal processor 372 is input into both inputs of NOR gate 382 through a second 390 pF capacitor 390. The inputs of NOR gate 382 are coupled to ground through a 10 kΩ potentiometer 392. The output of NOR gate 382 is coupled to the remaining input of NOR gate 384.

The Q signal output from NOR gate 384 is input into the non-inverting input of a differential amplifier 394 through a 10 kΩ resistor 396. The non-inverting input of the differential amplifier 394 is coupled to ground through a 0.1 μF capacitor 398. The inverting input of differential amplifier 394 is coupled to the output of differential amplifier 394 through a 10 kΩ potentiometer 396 that serves to set the gain of amplifier 394. The inverting input of differential amplifier 394 is coupled to the central node of a voltage divider comprising the series connection of a 100 kΩ potentiometer and a 10 kΩ resistor 402 coupled as shown in FIG. 11. The output of differential amplifier 394 comprises an analog signal indicative of the range to the acquired target.

The analog range signal output from amplifier 394 is transmitted to a processor 404 which converts the analog signal into a digital range value. The processor 404 also receives the valid data output received from differential amplifier 368 and a clock signal. The processor performs the signal processing and calculations necessary to drive the alarm signals and speed control signals as discussed previously.

NOR gates 378, 380, 382 and 384 may all be contained in one CMOS quad 2-input NOR gate chip such as the MM74HC02 chip manufactured by National Semiconductor. NOR gates 378 and 382 are connected as inverters which pulse output signals triggered by the leading edge of the respective square wave inputs to these NOR gates. NOR gates 380 and 384 are connected in a bistable flip-flop requiring a positive pulse from NOR gate 378 to make the Q signal go high then the positive pulse from NOR gate 382 to make the Q signal go low. 10 kΩ potentiometers 388 and 392 are adjusted to produce minimum pulse widths on the order of 25 nanoseconds from the respective outputs of NOR gate 378 and NOR gate 382 in order to reliably toggle the flip-flop configuration of NOR gates 380 and 384. The Q signal remains high between the arrival of a positive transitioning leading edge from the reference square wave signal and the arrival of a positive transitioning leading edge from the received square wave signal. By selecting either the $\phi_1$ signal or the $\overline{\phi}_1$ signal and by appropriately adjusting the 100 kΩ potentiometer 340, the system can be configured to set the time which the Q signal is high to a safe minimum limit calibrated for a target at 0 feet.

The RC filter comprising resistor 396 and capacitor 398 time averages the Q signal. The offset potentiometer 400 and the gain potentiometer 396 are adjusted to produce an analog signal directly proportional to the target distance.

The 2 MHz optical feedback oscillator range measurement system described with reference to FIGS. 9, 10, and 11 allows for a higher resolution in range detection due to the 360° phase detection compared to the 90° phase detection utilized in the 455 kHz range measurement system described with reference to FIGS. 5, 6, 7 and 8 previously. The 2 MHz system allows range measurements up to 250 feet at 2 MHz without aliasing whereas the 455 kHz system allows for range measurements to 275 feet using 90° phase detection. There is some loss of accuracy at the far and near ends of the range spectrum due to edge jitter noise in the received signals. The phase adjustment potentiometer 340 and the choice of the use of the $\phi_1$ or $\overline{\phi}_1$ signal is used to calibrate the phase such that the Q signal goes high for a very short time yet long enough to catch all of the edge jitter at the valid data threshold for a target at 0 feet. The DC averaged value of the Q signal is then subtracted by the offset adjustment of the non-inverting input of the output operational amplifier 394. This procedure insures that the analog range signal output is a linear function of the target distance out to over 200 feet. For targets beyond 250 feet, the problem of aliasing still arises. In theory, a perfect phase detector would create a Q signal that was high. Theoretically, the Q signal will still stay high for a longer and longer time for a greater and greater distances until at 250 feet the Q signal will stay high continuously. However, for a target slightly beyond 250 feet, the positive transitioning leading edge of the received square wave signal will arrive at the phase detector before the reference signal and the Q signal will stay low most of the time. In other words, a 2 MHz system with a theoretically perfect phase detector will interpret a target at 260 feet as being at 10 feet. This phenomena is known as aliasing and is common to all such single fixed frequency systems. Due to this problem as well as the signal noise ratio and the problems inherent with edge jitter noise and the finite resolving power of the electronic gates reduces the practical range of the 2 MHz system to something greater than 200 feet.

If the frequency of false alarms due to detection of targets beyond or close to 250 feet becomes a problem, the entire system shown in FIGS. 9, 10, and 11 may be duplicated to eliminate the problem. In the duplicate system, the 2 MHz filters 336, 360 and 364 are replaced with analogous 800 kHz ceramic resonators. The 2 MHz and 800 kHz systems then may operate in parallel. When the range measurement as determined by the 800 kHz system is beyond the threshold known to produce aliasing in the 2 MHz, the processor receiving the analog range signal outputs from both systems will use the measurement from the 800 kHz system in place of the measurement from the 2 MHz system. Such a parallel system allows the increased stability and resolving power of the 2 MHz system to be used yet it will not create alias signals until the target is on the order of 600 feet away.

It should be noted that it is not necessary to duplicate the entire system. The parallel 800 kHz and 2 MHz system may share the same receiving lens, photo-diode and preamplifier system. The same received signal from the broad band preamplifier 358 may be transmitted to the band pass limiting amplifiers and phase detectors of both the 800 kHz and 2 MHz systems.

With respect to calibration stability and resolving power, the 455 kHz system described with reference to FIGS. 7 and 8 previously will generate a change of 3 feet in the range measurement for every 1° change in the fixed phase shift in the receiver. This change in the fixed phase shift may result from aging of the components or temperature variations. A 1° phase shift in the 2 MHz system described previously results in an error of less than 1 foot in the range measurement. While the 2 MHz system has inherently greater resolution power and accuracy, the 455 kHz system enjoys the cost effectiveness because of the ready availability of the components used in its construction. 455 kHz filters and amplifiers are readily available due to the widespread use of the 455 kHz frequency in radio communications systems.

The ceramic resonators used in the remaining embodiments described herein are also very effective band pass filters. The intended application of ceramic resonators is in very low cost oscillators. The ceramic resonators may be used in this application due to the small bandwidth of less than 10 Hz necessary for the present invention. Ceramic resonators are not used in radio receiver applications because the intermediate frequency bandwidth must be substantially greater than 10 Hz to allow data or information transmission. The narrow bandwidth of the band pass filters constructed using the ceramic resonators described herein presents issues with respect to the selection of individual ceramic resonators used in the manufacturing of a particular system. The resonant frequency of commercially available ceramic resonators is ordinarily only specified to about $\frac{1}{2}$% which is comparable to the bandwidth used in the present invention when the ceramic resonators are utilized as bandpass filters. As with any bandpass filter, there is a phase shift for signals on either side of the center frequency. It is for this reason that each system may require the phase adjustment systems described previously in the selection of either the $\phi_1$ or $\bar{\phi}_1$ signal during calibration of a particular system.

The random selection of resonators from an incoming lot will not assure maximum performance or stability with respect to age and temperature. In order to insure this stability, automatic test equipment may be used to presort incoming lots to match center frequencies of the ceramic resonators to within on the order of 0.05%. If this presorting is accomplished, the three resonators used to assemble a given system could be randomly chosen from a matched lot.

In this manner, the entire lot of incoming resonators are still used, but all systems do not operate at the same frequency. Heterogenous operating frequencies of different systems will also help eliminate false alarms due to other vehicles using the same type of equipment. Presorting and mass testing of the ceramic resonators can be accomplished using methods known in the art and will introduce a cost of less than $0.01 per resonator once individual resonators are separated into lots. In addition, further testing can be used once three individual resonators are selected from the lot. The three resonators can be further tested and the resonator with the intermediate frequency may be used as resonator 336 in the oscillator. This configuration assures a stagger tuned receiver with two bandpass filters, one with a center frequency slightly above and one with a center frequency slightly below the transmitted frequency. These procedures may not be necessary for an operational system but may save significant later expense during the calibration procedure.

Costs of the system can be driven even lower by the integration of the components of the systems into single integrated circuit chips. For example, the Signetics Corporation offers a chip with the combined functionality of the NE604A and the NE602A used for circuits 362 and 372 described previously.

The 455 kHz system, the 2 MHz system and the dual system using 2 MHz and 800 kHz all theoretically result in a linear relationship of the phase shift and oscillation frequencies for the varying distance to the target. It should be understood that the processors, such as processor 404 and processor 117 described previously, can easily be programmed to rapidly and accurately translate almost any arbitrarily complex transfer function. This programming could compensate for any non-linearity in the relationship of the phase of the oscillation frequency to the range. This compensation could even be accomplished on an individual system-by-system basis during calibration. The only requirement of the oscillation frequency transfer function is that the gain of such function should roll off rapidly in higher frequencies to eliminate the possibility of higher mode oscillations as addressed previously. The gain roll off also helps to compensate for the fact that closer ranges correspond to higher frequencies and closer targets also return more of the reflected light signal. The optical feedback system obeys the same rules as radar in that the return signal is inversely proportional to the fourth power of the distance between the receiver and the target. For example, the same target at twenty feet returns ten thousand times the light that target would return at two hundred feet. This gradient is a great deal more extreme than the 20 dB gain roll off described previously. The systems described previously provide for a theoretically linear relationship with the oscillation frequency to the range to target. However, it should be understood that conventional processing methods can interpret virtually any complex oscillation frequency transfer function and output an accurate range measurement. The systems described herein are solely for the purposes of teaching important technical advantages of the various embodiments of the range measurement system described herein and should not be considered to limit the scope of the present invention to these or any particular embodiments.

Accordingly, a vehicle control system has been described which comprises a range measurement system capable of controlling conventional speed control systems in automobiles. The systems and circuitries used are highly accurate, yet inexpensive. The use of phase shift detection in a returned optical signal allows for extremely accurate range measurement. Alternate embodiments of the present invention utilize optical feedback architectures which similarly provide highly accurate range measurement using very inexpensive components.

Although the present invention has been described in detail, it should be understood that various changes, substitutions and alterations can be made hereto without departing from the spirit and scope of the invention which is solely defined by the appended claims.

What is claimed is:

1. A range measurement system, comprising:
   a transmitter circuit for transmitting an outgoing signal to a target, said transmitter circuit spontaneously transmitting said outgoing signal in response to any one of a plurality of random noise signals present in said transmitter circuit, each of said plurality of random noise signals having a unique oscillation frequency;
   a receiver circuit for receiving a reflected signal, said reflected signal being a reflection of said outgoing signal off of said target, said reflected signal oscillating with said outgoing signal at a particular oscillation frequency, said receiver circuit isolating said particular oscillation frequency in response to said oscillation of said reflected signal with said outgoing signal;
   a processing circuit for determining a range between the system and said target in response to said particular oscillation frequency, said particular oscillation frequency having a unique correspondence to said range.

2. The system of claim 1, wherein said receiver circuit includes a frequency counter for determining a frequency of said reflected signal.

3. The system of claim 1, wherein said receiver circuit generates a control signal to attenuate said transmitter circuit in response to a signal strength of said reflected signal.

4. The system of claim 1, wherein said receiver circuit eliminates aliasing of false frequencies.

5. A method of controlling range between a mobile vehicle and a target, comprising the steps of:
   transmitting an outgoing signal to the target, the outgoing signal being transmitted in response to any one of a plurality of random noise signals, each of the plurality of random noise signals having a unique oscillation frequency;
   receiving a reflected signal from the target, the reflected signal being a portion of the outgoing signal returned from the target;
   isolating a particular oscillation frequency in the reflected signal, the particular oscillation frequency occurring when the reflected signal and the outgoing signal oscillate with each other;
   determining a time to collision of the mobile vehicle and the target in response to the particular oscillation frequency in the reflected signal, the particular oscillation frequency having a unique correspondence to a specific range between the mobile vehicle and the target; and
   adjusting a speed of the mobile vehicle such that the time to collision remains substantially constant.

* * * * *